Figure 1:
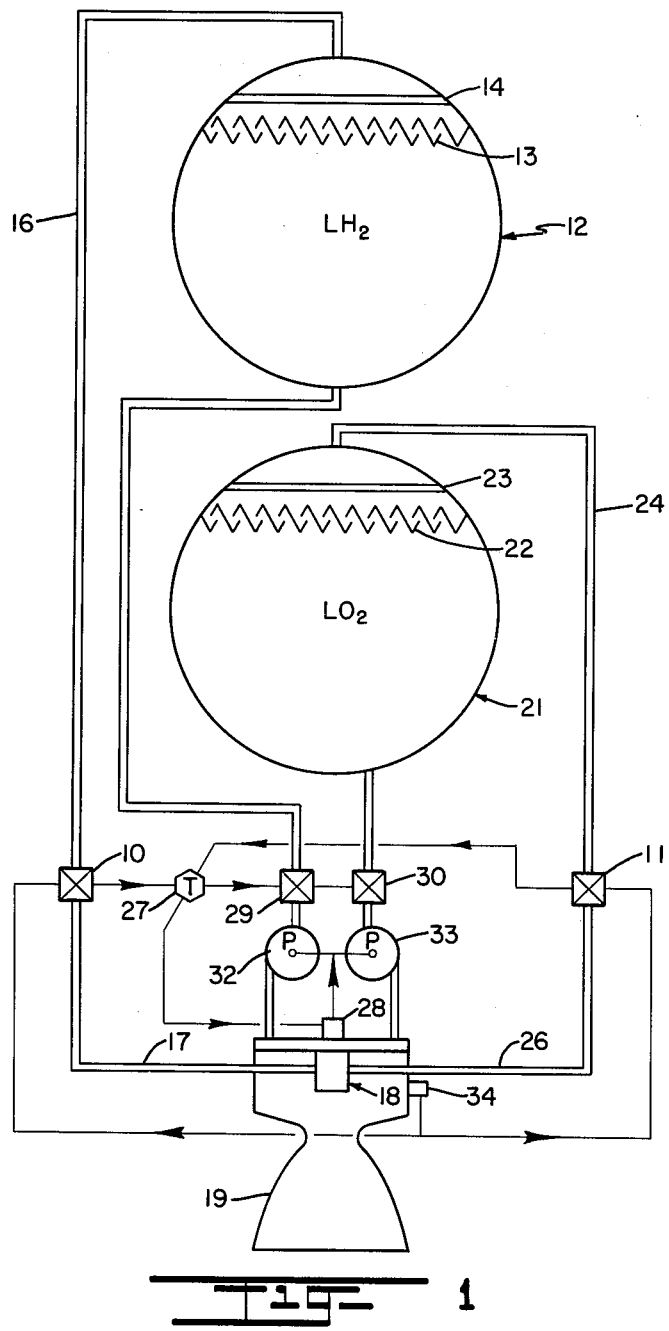

Dec. 21, 1965     R. J. KENNY     3,224,189
LIQUID ROCKET PROPELLANT FEED SYSTEM
Filed May 31, 1963                    2 Sheets-Sheet 1

INVENTOR.
RICHARD J. KENNY
BY
ATTORNEYS

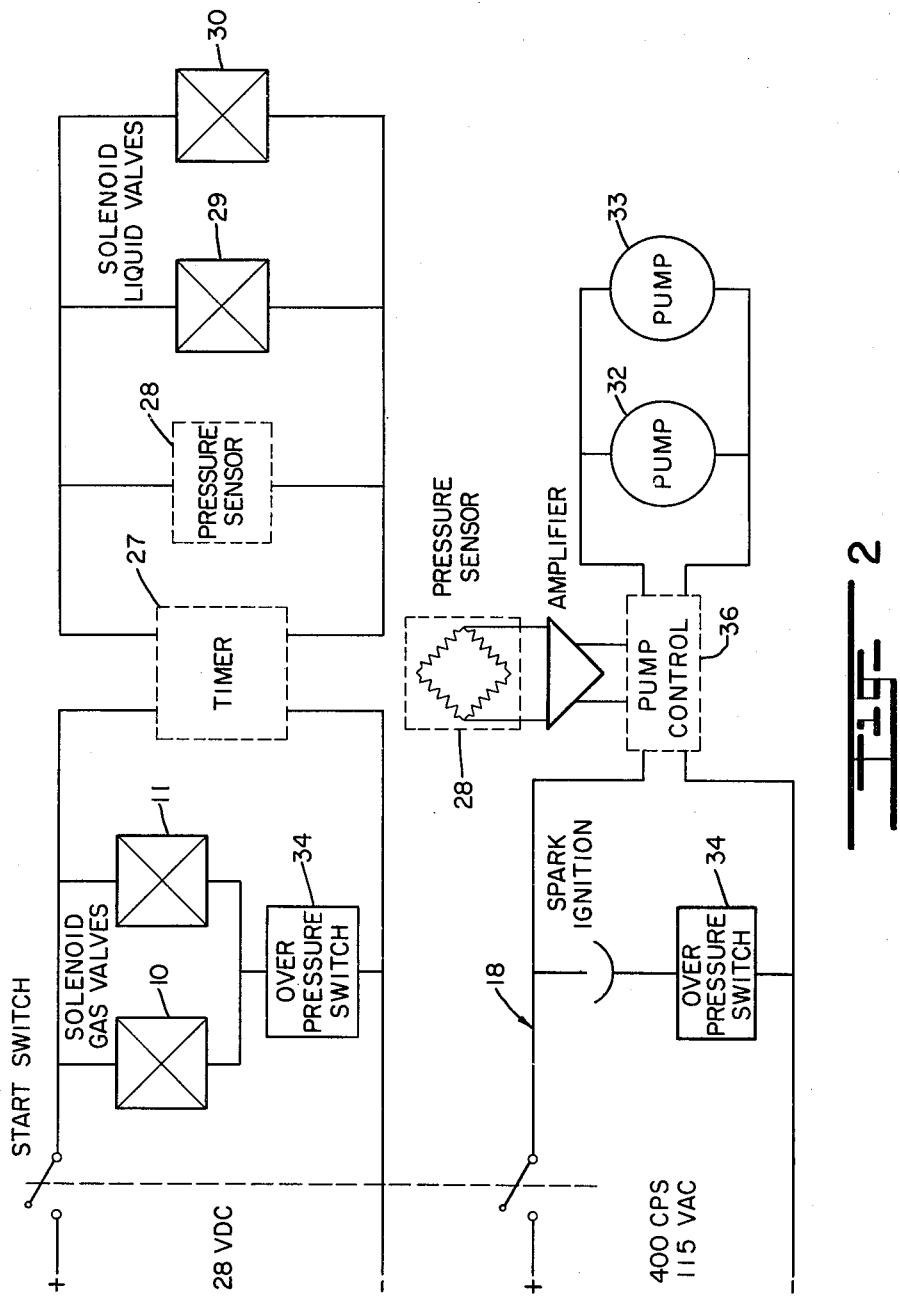

United States Patent Office 3,224,189
Patented Dec. 21, 1965

3,224,189
LIQUID ROCKET PROPELLANT FEED SYSTEM
Richard J. Kenny, Littleton, Colo., assignor to Martin-Marietta Corporation, Baltimore, Md., a corporation of Maryland
Filed May 31, 1963, Ser. No. 284,553
3 Claims. (Cl. 60—35.3)

This invention relates to a system and method for starting a liquid fueled rocket or vehicle under substantially weightless conditions.

While a rocket or rocket propelled vehicle is in a substantially zero gravity flight path, liquid and vapor phases of the propellant liquids are present in the propellant tanks in random fashion. Such dispersal of liquid and vapor phases in the propellant tanks and outlet lines presents a preplexing problem for pumping and metering of the propellant liquids. To insure the proper ignition and operation of the rocket engine in an approximately zero gravity environment, a propellant feed system and method are required which will deliver sufficient amounts of liquid propellants substantially free of any included vapor phases to the inlets of the supply pumps. Furthermore, the hardware employed in the system should be compact, low in weight and positive in operation.

Accordingly, it is an important object of this invention to provide a propellant feed system for starting a liquid fueled rocket at substantially zero gravity flight path conditions, and for restarting the rocket under such conditions if it has been cut off for any reason.

Another object of this invention is to provide such a system which is efficient and positive in operation, compact in space requirements, low in weight, and in which propellant orientation is accomplished in a highly efficient manner at a specific impulse of approximately 430 pounds force per pound mass of propellant.

Additional objects of this invention will become apparent from the following description which is given primarily for purposes of illustration and not limitation.

Stated in general terms, the objects of this invention are attained by separating vapors from liquids in the respective liquid propellant supply tanks of a liquid fueled rocket while in a substantially zero gravity environment, feeding the separated vapors to the rocket combustion chamber, igniting the admixed propellant vapors in the combustion chamber to impart a small amount of thrust to the rocket sufficient to bottom the liquid propellants within their respective supply tanks, thus eliminating the danger of the entry of propellant vapors into the inlets of their respective supply pumps, and then opening the main liquid propellant valves and starting the liquid propellant supply pumps for the commencement of normal rocket engine operation on liquid propellant feed.

A more detailed description of a specific embodiment of this invention is given below with reference to the accompanying drawings wherein:

FIG. 1 is a schematic diagram showing a liquid rocket propellant system including a rocket combustion chamber, liquid propellant tanks and auxiliary equipment; and FIG. 2 is a schematic electric circuit diagram showing the operating circuit employed with the system of FIG. 1.

When a cryogenic liquid fueled rocket containing the system shown in the drawing, is in a substantially zero gravity flight path, and it is desired to start the propulsion system in that environment, solenoid valves 10 and 11 are opened simultaneously by energizing them electrically. These valves can be made of stainless steel or aluminum and employ metal to metal seats to minimize leakage. Vapors of liquid hydrogen fuel kept in tank 12 are separated from the liquid hydrogen therein and maintained under slosh baffle 13. Slosh baffle 13 serves to prevent penetration of liquid hydrogen through the baffle during rapid rocket deceleration conditions. Such prevention of liquid penetration of baffle 13 guards surface tension sieve 14 from becoming saturated and thus becoming useless. The hydrogen vapors are separated mechanically from the liquid hydrogen fuel supply with the aid of surface tension sieve 14. Surface tension sieve 14 is about 200 mesh, and can be made of wire such as stainless steel or aluminum wire for example.

The thus separated hydrogen vapors, free of liquid hydrogen, are passed through gas supply line 16, valve 10 and line 17 to combustion chamber 18 in rocket exhaust nozzle 19. Vapors of liquid oxygen oxidizer, kept in supply tank 21, are similarly separated from the liquid oxygen in the tank under slosh baffle 22. A surface tension sieve 23, having mechanical characteristics similar to that of surface tension sieve 14, described immediately above, is used to facilitate the separation process. The resulting oxygen vapors, free of liquid oxygen, are transferred through gas supply line 24, valve 11 and line 26 to combustion chamber 18. The flow of both the hydrogen vapors and the oxygen vapors from the supply tanks 12 and 21, respectively, is accomplished by maintaining a pressure differential between the tanks and the combustion chamber 18. For example, a pressure of about 15 p.s.i.a. is maintained in the tanks 12 and 21 when the lower pressure in the combustion chamber 18 is in the range of about 2 to 10 p.s.i.a. Valves 10 and 11 are constructed to meter the proper mixture of gases to the combustion chamber 18. The usual mixture is a 5 to 1 ratio in favor of the oxidizer on a weight basis. The electrical timer 27, which preferably of the semiconductor type with the R.C. circuit controlling an internal relay, is electrically activated at the same time that ignition of the mixture of hydrogen and oxygen vapor streams is accomplished in combustion chamber 18. Igination is accomplished by a typical spark igniter. The preferred ignition system would utilize 115 v. A.C. 400 c.p.s. power commonly used in rocket systems. The combustion of the mixed vapor streams imparts a continuous thrust to the rocket. This thrust is sufficient to cause the liquid hydrogen fuel in tank 12 and the liquid oxygen oxidizer in tank 21 to move to the bottom in each tank respectively in preference to the vapor therein, because of the much greater density of the liquid over the vapor. As a result, a normal orientation of liquid and vapor in a container is established which is similar to that which exists in a gravitational environment, such as that on the surface of the earth.

After a predetermined safe interval of time has expired, as measured by timer 27, for the bottoming of the liquid hydrogen and liquid oxygen in supply tanks 12 and 21, respectively, as a result of the continuous thrust imparted to the rocket vehicle by the combustion of the mixed streams of hydrogen and oxygen vapors in combustion chamber 18 and rocket exhaust nozzle 19; a pressure sensor 28, electrically connected to timer 27, is electrically energized as shown in FIG. 2. Main liquid propellant solenoid valves 29 and 30 are opened by electrical energization through timer 27, as indicated in the drawings. Pressure sensor 28 which can be a strain gage bridge-type pressure transducer, adjusts the pumping speed of main liquid hydrogen supply pump 32 and that of main liquid oxygen supply pump 33 to the rate required for efficient combustion and to maintain nominal predetermined gas pressure in combustion chamber 18. Pressure sensor 28 is actuated by pressure existing in combustion chamber 18 after it is energized by timer 27. The output voltage is proportional to the chamber pressure, thus permitting adjustment of the speed of pumps 32 and 33 to maintain the desired engine thrust. Solenoid valves 29 and 30 are used only to initiate and terminate flow. The pumps 32 and 33 actually meter the propellants in the proper ratio through a common shaft with the speed controlled by the output of pressure sensor 28. Hot exhaust gases of the combustion are prevented from entering tanks 12 and 21 during periods of normal engine operation by an electric over-pressure switch 34, which closes solenoid valves 10 and 11 as soon as normal engine operation commences. Over-pressure switch 34 can be a Belleville spring type switch, which is normally closed. The pump control 36 is a transformer, the output of which is modulated by the input signal received from pressure sensor 28.

Although the system and method of the invention has been illustrated above as applied to a rocket using liquid hydrogen fuel and liquid oxygen oxidant, it will be understood that the invention can be applied to other liquid fuel and oxidant systems, especially to other cryogenic liquid fuel and oxidant systems. Also the above described system can be varied by having the ignition and starting combustion of the fuel and oxidant vapors take place in an auxiliary combustion chamber rather than in the main engine combustion chamber. Instead of a semiconductor type electrical timer 27, a standard clock and cam timer can be used. The auxiliary combustion chamber, such as chamber 18, used to burn, the propellant vapor would be similar to those used in conventional rocket motors to burn liquid propellants. Due to the difference in mass flow of the propellant liquids and vapors, a separate design is required for each system for maximum efficiency. The auxiliary combustion chamber is an essential part of the system because the thrust generated by burning the propellant vapors is used to bottom the liquids in the main propellant tanks so that they can be pumped into the main engines.

Obviously, many other modifications and variations of the liquid rocket propellant feed system of the present invention are possible in the light of the teachings given hereinabove. It is, therefore, to be understood that, within the scope of the appended claims, the invention can be practiced otherwise than as specifically described.

What is claimed is:

1. A system for starting a liquid propelled rocket engine in a substantially zero gravity environment which comprises a propellant combustion chamber, liquid propellant supply containers, vapor-liquid separation means inside the supply containers for delivering vapor therefrom, means for conveying separated propellant vapor to the combustion chamber, timing means for timing the initiation of combustion of propellant vapor in the combustion chamber and permitting the bottoming of liquid in the supply containers and switching means controlled by the timing means for switching from the temporary feeding of propellant vapor to the normal feeding of propellant liquid to the combustion chamber.

2. A method for starting a liquid propelled rocket engine in a substantially zero gravity environment which comprises the steps of separating vapors from the liquids in the fuel and oxidant liquid supply containers, feeding the separated vapors to a rocket fuel combustion chamber, igniting the vapors in the combustion chamber to produce a thrust, utilizing said thrust to bottom the liquid fuel and liquid oxidant in their respective containers, timing the combustion of said vapors and switching the combustion chamber from the temporary combustion of vapors to the normal combustion of liquid fuel and oxidant after sufficient time has elapsed to bottom said liquid fuel and liquid oxidant in their respective containers.

3. A system for starting a liquid propelled rocket vehicle in a substantially zero gravity environment which comprises a propellant combustion chamber; a plurality of liquid propellant supply containers; baffle means in each said container separating it into a liquid containing portion and a vapor containing portion, said baffle means preventing the passage of liquid into said vapor portion during rapid deceleration; a surface tension sieve in each of said vapor portions for separating propellant vapor from propellant liquid; first conduit means connected between each said tension sieve and said combustion chamber for conveying separated propellant vapor to said combustion chamber; second conduit means connected between the liquid containing portion of each said container and said combustion chamber; and switching means in said first and second conduit means for terminating the flow of propellant vapor and initiating the flow of propellant liquid to said combustion chamber.

References Cited by the Examiner
UNITED STATES PATENTS

| | | | |
|---|---|---|---|
| 2,602,289 | 7/1952 | Anxionnaz et al. | 60—39.71 X |
| 2,955,420 | 10/1960 | Schirmer | 60—39.71 X |
| 3,024,606 | 3/1962 | Adams et al. | 60—39.71 X |
| 3,052,095 | 9/1962 | Prachar | 60—39.28 |

MARK NEWMAN, *Primary Examiner.*

SAMUEL FEINBERG, *Examiner.*